(12) United States Patent
Derbenwick et al.

(10) Patent No.: US 6,262,975 B1
(45) Date of Patent: Jul. 17, 2001

(54) METHOD OF AUDITING CROSS-CONNECTIONS RELATED TO CONCATENATED SIGNALS IN A SYNCHRONOUS OPTICAL NETWORK

(75) Inventors: Leland Frank Derbenwick, Haverhill, MA (US); Ravichandran R. Iyer, Freehold, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/112,417

(22) Filed: Jul. 9, 1998

(51) Int. Cl.[7] .................................................. G01R 31/08
(52) U.S. Cl. .......................................... 370/244; 370/535
(58) Field of Search .................................... 370/216, 217, 370/218, 222, 223, 225, 227, 228, 230, 241, 242, 244, 248, 249, 250, 252, 351, 389, 395, 397, 399, 460, 474

(56) References Cited

U.S. PATENT DOCUMENTS 5,706,276 * 1/1998 Arslan et al. ......................... 370/216
5,781,535 * 7/1998 Russ et al. ............................ 370/248

* cited by examiner

Primary Examiner—David R. Vincent
(74) Attorney, Agent, or Firm—Steve Mendelsohn

(57) ABSTRACT

A facility is provided for use in a communications network node to monitor the way in which particular signals are transported over the network and block those signals which are not being transported correctly. The facility is particularly useful for ensuring that a concatenated signal in a SONET transport system is transported correctly over contiguous channels.

22 Claims, 5 Drawing Sheets

| 1 W-1 | 1 E-1 |
| 1 W-2 | 1 E-2 |
| 1 W-3 | 1 E-3 |
| 2 W-1 | 2 E-1 |
| 2 W-2 | 2 E-2 |
| 2 W-3 | 2 E-3 |
| 3 W-1 | 3 E-1 |
| 3 W-2 | 3 E-2 |
| 3 W-3 | 3 E-3 |
| ⋮ | ⋮ |
| 16 W-1 | 16 E-1 |
| 16 W-2 | 16 E-2 |
| 16 W-3 | 16 E-3 |

FIG. 3
CROSS-CONNECT MAP

| 1 W-1 | 1 E-1 |
| 1 W-2 | 6 E-2 |
| 1 W-3 | 6 E-3 |
| 2 W-1 | 1 E-2 |
| 2 W-2 | 3 E-1 |
| 2 W-3 | 8 E-2 |
| 3 W-1 | 8 E-3 |
| 3 W-2 | 4 E-3 |
| 3 W-3 | 7 E-2 |
| ⋮ | ⋮ |
| 11 W-1 | 11 E-1 |
| 11 W-2 | 11 E-2 |
| 11 W-3 | 11 E-3 |
| ⋮ | ⋮ |
| 16 W-1 | — |
| 16 W-2 | — |
| 16 W-3 | — |

METHOD OF AUDITING CROSS-CONNECTIONS RELATED TO CONCATENATED SIGNALS IN A SYNCHRONOUS OPTICAL NETWORK

FIELD OF THE INVENTION

The invention relates to optical networks and more particularly relates to auditing cross-connections provisioned to carry a concatenated signal in a optical transport system.

BACKGROUND OF THE INVENTION

The basic signal used in SONET is referred to as a STS-1 (Synchronous Transport Signal level 1), which has a bandwidth of 51.84 Mb/s. As is well-known, a STS-1 includes overhead information (e.g., a payload pointer) and payload information. It can be appreciated that in certain instances there is need to transport payload information (signals) at a rate/bandwidth greater than a STS-1. That is, a larger envelope is needed to transport the signals. This is particularly true for video signals, e.g., High Definition TeleVision (HDTV), Asynchronous Transport Mode service and similar services (i.e., video conferencing). To meet that need, N STS-1's are grouped together to form a bandwidth (envelope) larger than that provided by a single STS-1, in which N STS-1s are identified as a STS-N circuit. Also, for video services and like service requirements, there is a need to concatenate STS-1s to preserve the integrity of the transmission—which means that the larger envelope is transported as a single entity. Concatenation is identified in a SONET transport system by the letter c, e.g., STS-Nc, where N>1. Thus, N contiguous STS-1 channels need to be assigned to a STS-Nc signal.

Since a STS-Nc is transported as a single entity, only one payload pointer is needed. The unused pointers may then be used to identify the concatenated signals. The first payload pointer in the first of the N STS-1s contains a normal pointer value, and each of the succeeding payload pointers instead contains a concatenation indicator.

Typically, a so-called Operations System (OS) is the facility that assigns/provisions N contiguous STS-1s in a SONET transport system to handle a particular concatenated signal. If such provisioning is not done correctly, then there is good chance that a concatenated signal may not be transported as a single entity over a group of contiguous STS-1 s, which may cause the system to generate a series of alarms that do not specifically identify the problem. As such, the OS may not be able to quickly resolve the problem. In certain instances alarms may not be generated even though such provisioning is incorrect. For example, consider the case where two groups of contiguous STS-1 s have been provisioned to transport respective concatenated signals and that a STS-1 of one group is inadvertently swapped with a STS-1 of the other group such that the pointer protocol for the concatenated signals is still preserved. In that case, the structure of both concatenated signals would appear to be correct, and, thus, the system would not generate an alarm. In fact, only the respective recipients of the signals would be able determine that the integrity of the received signal had been compromised.

SUMMARY OF THE INVENTION

The foregoing problems are addressed and the relevant art is advanced by providing an auditing process that monitors incoming signals and blocks the outputting of a signal if the pattern of output channels assigned to that signal is not correct. Specifically, the process detects different trigger states associated with the processing of a particular incoming signal, and responsive to detecting the presence of one of the trigger states and responsive to a determination that the incoming signal is of a particular type, then the process determines if a pattern of outputs paths specified for the incoming signal meet a predetermined criterion and inserts an alarm signal in the specified output paths in place of the incoming signal if the predetermined criterion is not met. Advantageously, then, the claimed invention allows a communications system to output a concatenated signal only when contiguous channels have been assigned to that signal.

These and other aspects of the invention will be appreciated from the following detailed description and accompanying drawing.

BRIEF DESCRIPTION OF THE DRAWING

In the drawing:

FIGS. 2 and 3 are illustrative examples of respective cross-connect maps; and

DETAILED DESCRIPTION

Figure 1:
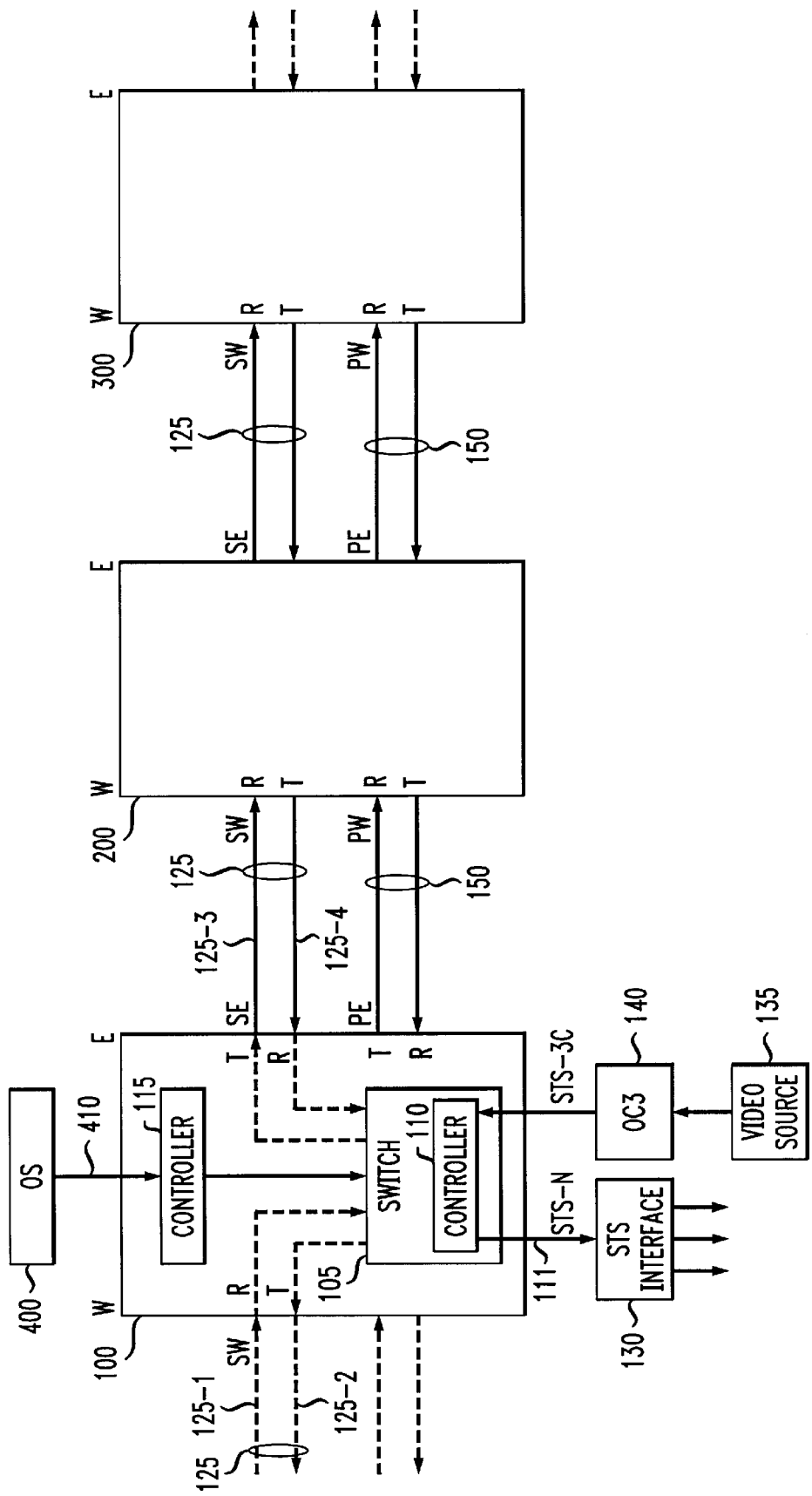
FIG. 1 is a broad block diagram of an illustrative SONET transport system in which the principles of the invention may be practiced.

FIG. 1 illustrates a portion of a bi-directional optical transport ring that transmits and receives optical signals in accordance with the well-known SONET standard. An optical node in the ring, e.g., node 100, receives through an appropriate interface arrangement (not shown) a plurality of so-called STS-1 signals via a respective incoming segment, e.g., segment 125-1 of bi-directional path 125, and multiplexes the received STS-1 signals via switch 105 to pre-assigned STS-1 signals transmitted over path segment 125-3. The way in which an optical node multiplexes a STS-1 signal that is received via an incoming path to another STS-1 signal of an outgoing path is well-known and will not discussed herein. Such multiplexing/switching may be readily achieved using what is commonly referred to as a digital cross-connect system (DCS).

The input and output of each node is referred to as the west and east sides of the node, respectively, and a circuit assignment is based on that nomenclature. For example, assume that each segment of the opposite paths forming bi-directional ring 125 transports 48 STS-1s. FIG. 2 illustrates one example of the way in which the 48 STS-1 may be assigned at input 125-1 and output 125-3, in which an incoming STS-1 signal, e.g., the 3W-3 STS-1 signal, may be assigned and cross-connected to any one of the outgoing paths, e.g., the path for the 3E- STS-1 signal. Such cross-connecting is governed by a so-called cross-connect map, an example of which is shown in FIG. 3. Controller 110 of switch 105 uses the cross-connect map to map the multiplexing of incoming STS-1s to outgoing STS-1s. For example, switch 105 maps the 3W-3 incoming STS-1 to the 7E-2 outgoing STS-1. As another example, switch 105 maps the 3W-1 incoming STS-1 to the 8E-3 outgoing STS-1, and so on. The provisioning of the cross-connect map is done in response to connection instructions that a node receives from, for example, a conventional Operations System (OS) 400 or a technicians terminal (not shown), as will be discussed below.

Each of the optical nodes of the bi-directional ring network, e.g., node 100, includes, inter alia, a conventional add/drop feature. Specifically, the capability of adding one or more STS-1s to the transport stream outgoing to, for example. segment 125-3, and/or dropping one or more STS-1 s incoming from, for example, segment 125-1, is done in accordance with particular provisioning instructions issued by OS 400 and executed by the respective controller 115. The add/drop feature is illustrated in FIG. 1, and shows that switch 100 is capable of cross-connecting a number of STS-1 s to output path 1 11 connecting to STS interface 130. Switch 105 performs such dropping in accordance with respective cross-connect instructions stored in the cross-connect map of FIG. 3. (That is, the cross-connect map is stored in memory (not shown) internal to controller 115.) Instructions in the cross-connect map of FIG. 3 maps the multiplexing (cross-connecting) of the incoming STS-1s to path/port 1 11. Interface 130 then delivers the "dropped" STS-1 s to the appropriate users.

FIG. 1 shows video source 135 coupled to conventional OC3 interface circuit 140. Assume at this point that it is desired to establish a connection from node 100 to a destination node in the SONET ring so that video source 135 may supply a 150 Mb/s signal to OC3 140 in the form of three concatenated STS-1c signals for delivery to the destination node. As discussed above, a concatenated signal requires contiguous STS-1 assignments. To meet that requirement, OS 400 sends instruction messages to controller 115 requesting a copy of cross-connect map of FIG. 3. In addition, OS 400 sends similar instructions via a path 125 signaling channel (also referred to as the data communication channel) to each one of the optical nodes that will form the path from node 100 to the destination node to ensure that the each such optical node transports the concatenated signal via contiguous STS-1s. Controller 115, in response to the request, interacts with OS 400 to locate a sufficient number of contiguous STS-1s in the FIG. 3 cross-connect map that may be used to transport the concatenated signal to optical node 200. For the purpose of the following discussion, assume that assignments 11E-1 through 11E-3 are available (not used), and, therefore, may be assigned to transport the concatenated signal (data) that will be received from source 135 via OC3 140. Once it makes the assignment, OS 400 then passes the assignment via controller 115 to controller 110. Switch 105 thereafter multiplexes the STS-3c signal that is received from OC3 to the assigned STS-1s (11E-1 through 11E-3). When the cross-connections are completed, then node 100 communicates the assignment to optical node 200, which then cross-connects those assignments with contiguous assignments that OS 400 specified for node 200. Node 200 similarly communicates with the next optical node in the ring, e.g., node 300.

When the foregoing has been completed, then node 100 thereafter multiplexes the STS-3c signal that it receives from OC3 to the assigned STS-1s.

As mentioned above, if such provisioning is not done correctly, then a concatenated signal may not be transported as a single entity to the destination, which will cause the nodes receiving the compromised signals to generate alarms, which, as also mentioned, do not specifically identify the problem. Disadvantageously, OS 400 may not be able to quickly resolve the underlying cause of the alarms. As also mentioned above, such incorrect provisioning may not cause an alarm to be generated. For example, consider the case where two groups of contiguous STS-1s have been provisioned to transport respective concatenated signals and a STS-1 of one group is inadvertently swapped with a STS-1 of the other group such that the pointer protocol for the concatenated signals is preserved. In that case, then the structure of both concatenated signals would appear to be correct, and, thus, the system would not generate an alarm. In fact, only the respective recipients of the signals could determine that the integrity of the received signal had been compromised.

We deal with the problem, in accordance with an aspect of the invention, by auditing a cross-connection assignment specified for a concatenated signal at an optical node whenever the assignment changes to ensure that the changed assignment is provisioned correctly for the concatenated signal. Accordingly, then, the audit will identify an incorrect assignment that has been provisioned for a STS-Nc, and block the assignment from being used until it is corrected. Such auditing also occurs after OS 400 supposedly corrects the error, since the OS 400 "correction" itself represents a change. Moreover, in response to a provisioning instruction, the optical node checks to see if the instruction involves a concatenated signal. If so, then the node checks the provisioning instructions to ensure that contiguous output STS-1 time slots have been assigned to the concatenated signal. The audit suppresses (blocks) the assignment and generates an alarm if it finds that contiguous output time slots have not been provisioned for the concatenated signal.

Figure 4:
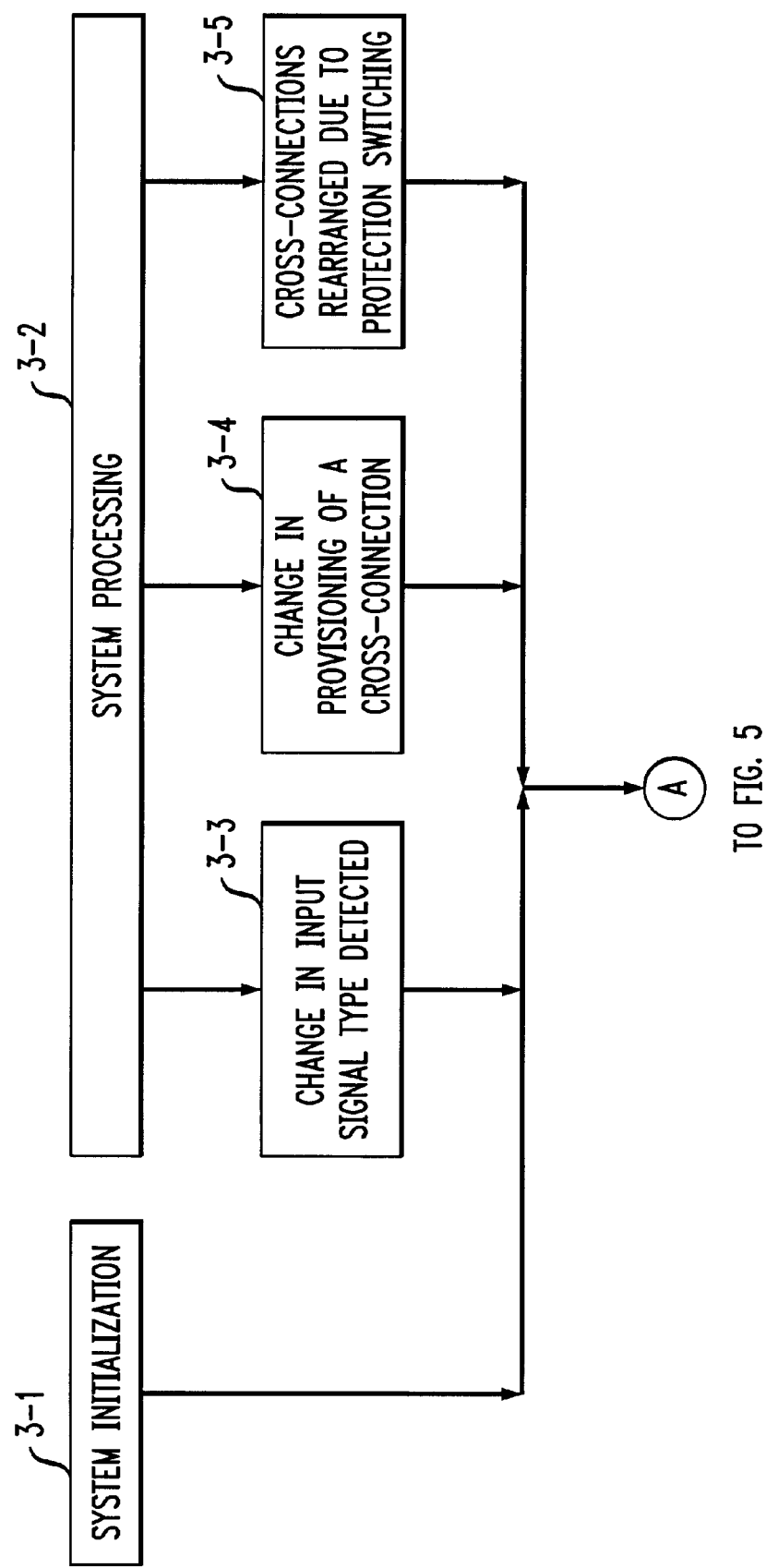
FIGS. 4 through 6 show in flow chart form an illustrative program which implements the principles of the invention in a node of FIG. 1.
Figure 5:
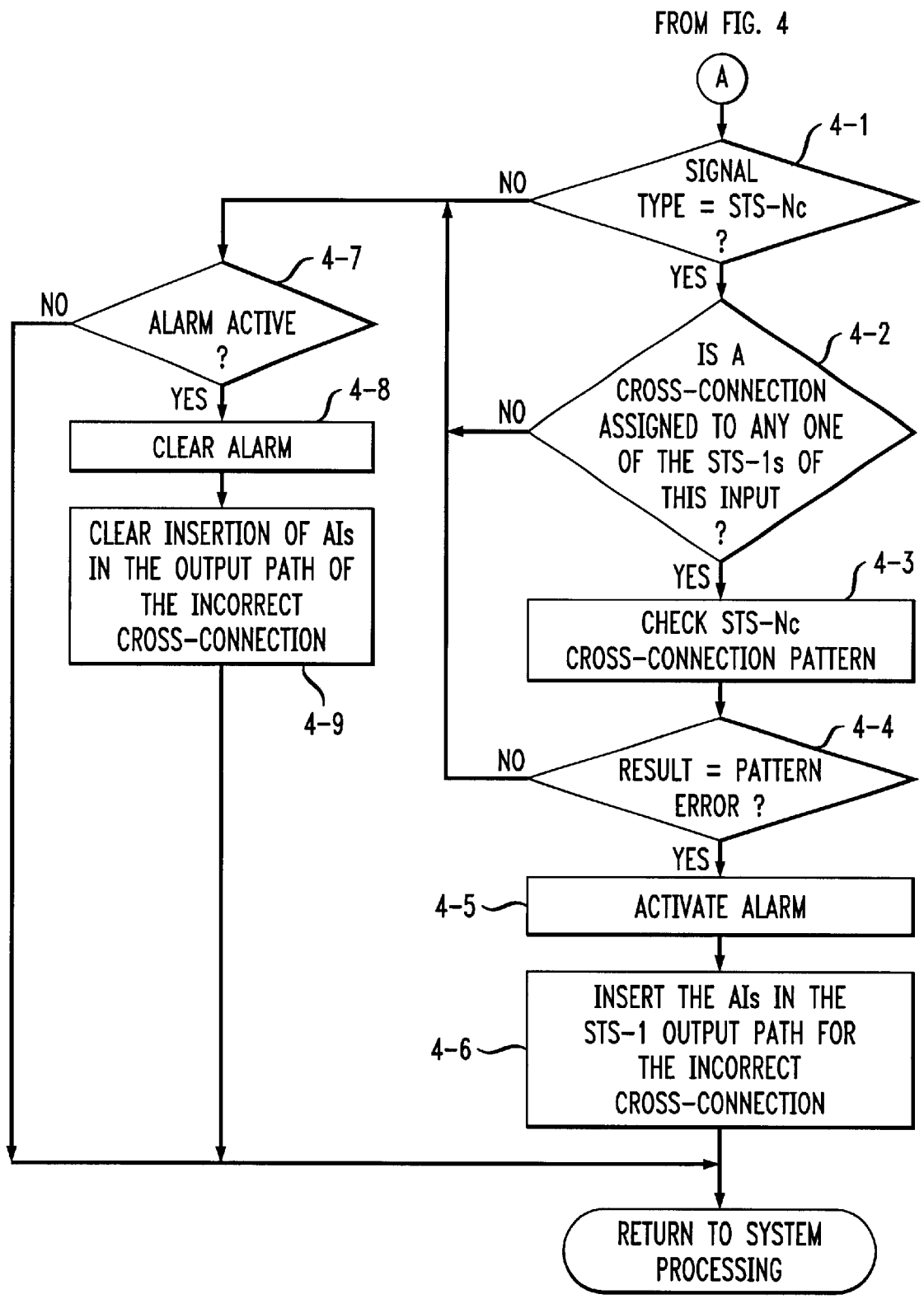
Figure 6:
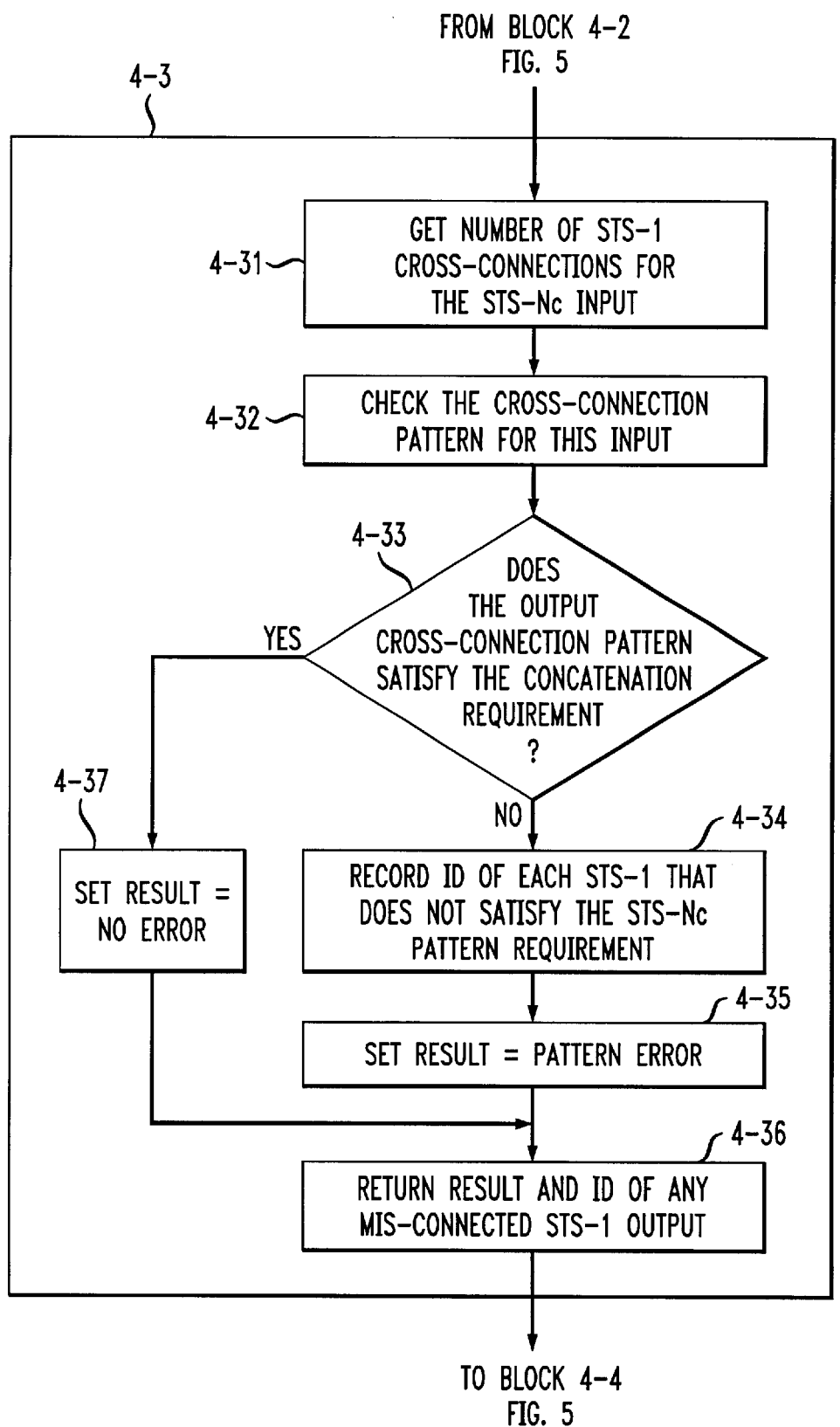

With the foregoing in mind, we turn to FIGS. 4 through 6 which illustrate in flow chart form the program which implements the principles of the invention in controller 115 of a node, e.g., node 100. Specifically, FIG. 4 is an illustrative example of some of the triggers which cause the program to determine if the cross-connection pattern of a respective STS-Nc signal is correct—meaning that the STS-1 signals forming the inputted concatenated signal are respectively cross-connected (mapped) to a sequence of successive output channels (contiguous channels). If so, then the program returns to the regular processing of cross-connections. Otherwise, the program flags the error and proceeds as will be discussed below. Specifically, such processing is invoked during regular processing (block 3-2) responsive to a one of plurality of triggers. Such triggers include, for example, a system initialization (block 3-1); a change in an input signal type, for example, a change from a non-concatenated signal to a concatenated signal (block 3-3), or vice-versa; a change in the provisioning of a particular cross-connection (block 3-4); or the active cross-connections are rearranged as a result of the system (node) invoking conventional protection switching.

When a trigger occurs, then the controller invokes the program of FIG. 5, which first determines (block 4-1) if the signal type of the input that is being investigated is a concatenated signal. If not, then the program proceeds to block 4-7. Otherwise, the program proceeds to block 4-2 to determine if a cross-connection has been provisioned for at least one of the STS-1s forming the input. If not, then the program proceeds to block 4-7. If so, then the program (block 4-3) checks the cross-connection pattern provisioned (assigned) to the concatenated input signal. An expanded version of block 4-3 is shown in FIG. 6.

Specifically, at block 4-31, the program consults a conventional circuit provisioning table to determine the number of STS-1 signals assigned to the input being processed, e.g., one, two, three, etc. The program (block 4-32) then checks a cross-connection table to determine if the incoming STS-1 s are assigned, on a one-to-one basis, to respective consecutive output channels (time slots). If the program (block 4-33) finds that at least one of the STS-1 s forming the incoming concatenated signal is not so assigned, or if one of the STS-1 signals is also being cross-connected to another output, then the program (block 4-34) stores the identity of the incorrectly assigned output and identity of each STS-1 signal that does not satisfy the concatenated signal pattern requirement in local memory. The program (block 4-35) then sets a RESULT flag to a value of error to indicate that the output pattern for the concatenated input is not correct. If the program does not detect a pattern error at block 4-33, then the program (block 4-37) sets the RESULT flag to a value of no error and then proceeds to block 4-36, where the program stores the RESULT flag and identities of incorrect output assignments in local memory.

Returning to FIG. 5, the program (block 4-4) checks the value of the RESULT flag and proceeds to block 4-7 if that value indicates that the cross-connection assignment for the incoming concatenated STS signal appears to be correct. Otherwise, the program (block 4-5) activates an alarm (a conventional AIS signal) to indicate that an error has occurred. More specifically, the program suppresses the signal at the identified output by inserting the activated AIS in the signal stream at the identified output at the appropriate time (channel). The program may also raise a user indication alarm in addition to notifying OS 400. The program then returns control to the system program.

At block 4-7, the program determines if an AIS had been previously activated for the input being processed. If not, then the program returns control to the system program. If so, then the program (block 4-8) clears the alarm by terminating the process that is inserting the alarm in the identified output(s), and then returns control to the system program.

It will thus be appreciated that, although the invention illustrated herein is described in the context of a specific illustrative embodiment, those skilled in the art will be able to devise numerous alternative arrangement which, although, not explicitly shown or described herein, nevertheless, embody the principles of the invention and are within its spirit and scope. For example, it is clear from the foregoing that the principles of the invention may be readily employed in a SONET having a configuration other than a ring configuration, e.g., a so-called linear add/drop network. As another example, it may be appreciated that the claimed auditing process may be used in other types of communications networks, e.g., a wireless communications network. As another example, if a node has a limitation such that it cannot independently detect an incoming STS-Nc signal, then a downstream node having that capability may be readily arranged so that it passes information identifying an incoming concatenated signal upstream to the node receiving the signal. The receiving node may then determine (audit) if the pattern of the received signal to see if it meets the requirement for concatenated STS signals. As a further example, the instant invention may be readily used in the well-known Synchronous Digital Hierarchy (SDH) system which is somewhat similar to the SONET transport system. SDH transports a basic signal known as STM-1 (Synchronous Transport Module level 1, which is a 155.52 mb/s signal) as well as concatenated signals, i.e., STM-Nc signals.

We claim:

1. A SONET network formed from a plurality of optical switching nodes that cross-connect optical signals received via respective inputs to assigned outputs, at least one of said nodes comprising
    a map that specifies each such cross-connection,
    a detector that detects the presence of at least one of a plurality of different triggers, in which at least one of the triggers may be associated with a particular signal received by the at least one node via an input path, and
    a processor that is invoked whenever one of said triggers is detected to determine, using at least the map, if a correct output path pattern is assigned to the particular input signal.

2. The network of claim 1 wherein a change in an input signal type is a trigger.

3. The network of claim 1 wherein an input signal that is changed from a non-concatenated signal to a concatenated signal is a trigger.

4. The network of claim 1 wherein a change in a previously provisioned cross-connection is a trigger.

5. The network of claim 1 wherein a change in a cross-connection due to protection switching is a trigger.

6. The network of claim 1 wherein the particular input signal is a concatenated signal and the pattern of the output path specified for the particular signal is contiguous channels.

7. The network of claim 6 wherein the particular concatenated signal is formed from N STS-1 optical signals, where N>1.

8. The network of claim 1 wherein if the pattern is not correct, then the processor inserts an alarm in the specified output path in place of the particular signal.

9. The network of claim 8 wherein if the pattern is correct, then the processor clears the insertion of an alarm, if present, in the specified output path.

10. The network of claim 1 wherein a trigger is detected when an incoming signal changes from a concatenated signal to a non-concatenated signal.

11. A signal auditing process for a communications network
    a first processor for cross-connecting signals received via respective input paths with specified output paths, and
    a second processor that detects different trigger states associated with processing a particular incoming signal, and responsive to detecting the presence of one of the trigger states and responsive to a determination that the incoming signal is of a particular type, then determines if a pattern of outputs paths specified for the incoming signal meet a predetermined criterion and inserts an alarm in the specified output paths in place of the incoming signal if the predetermined criterion is not met.

12. The signaling auditing process of claim 11 wherein the second processor allows the incoming signal to be outputted to the specified output paths if the criterion is met.

13. The signal auditing process of claim 11 wherein when the incoming signal is a concatenated signal, then the predetermined criterion requires that a sequence of successive output channels need to be assigned to a concatenated signal.

14. The signal auditing process of claim 11 wherein the communications network is a synchronous optical network.

15. The signal auditing process of claim 13 wherein the concatenated signal is formed from N STS-1 optical signals, where N>1.

16. The signal auditing process of claim 11 wherein a trigger is detected when an input signal type changes.

17. The signal auditing process of claim 11 wherein a trigger is detected when an incoming signal changes from a non-concatenated signal to a concatenated signal.

18. The signal auditing process of claim 11 wherein a trigger occurs when change in a previously provisioned cross-connection is a trigger.

19. The signal auditing process of claim 11 wherein a trigger is detected when a cross-connection changes due to protection switching.

20. The signal auditing process of claim 11 wherein a trigger is detected when an incoming signal changes from a concatenated signal to a non-concatenated signal.

21. The signal auditing process of claim 11 wherein the communications system is a SONET transport system.

22. The signal auditing process of claim 11 wherein the communications system is a Synchronous Digital Hierarchy system.

* * * * *